United States Patent [19]

Cook et al.

[11] Patent Number: 4,666,081
[45] Date of Patent: May 19, 1987

[54] PROGRAMMABLE THERMOSTAT AND SYSTEM THEREFOR

[75] Inventors: John E. Cook; Gary M. Everingham, both of Chatham, Canada

[73] Assignee: Canadian Fram Limited, Chatham, Canada

[21] Appl. No.: 856,748

[22] Filed: Apr. 28, 1986

[51] Int. Cl.$^4$ .................. F01B 29/10; F16K 31/00
[52] U.S. Cl. .................... 236/68 R; 60/523; 236/34.5; 251/11
[58] Field of Search ............ 236/34.5, 42, 43, 68 R; 251/11; 60/523

[56] References Cited

U.S. PATENT DOCUMENTS

| | | | |
|---|---|---|---|
| 3,266,235 | 8/1966 | Carlson, Jr. | 236/68 R X |
| 4,043,532 | 8/1977 | Draxler | 251/11 |
| 4,175,696 | 11/1979 | Braukmann | 236/34.5 |
| 4,493,455 | 1/1985 | Pruett | 236/34.5 |

FOREIGN PATENT DOCUMENTS 2155153  9/1985  United Kingdom .............. 236/34.5

Primary Examiner—William E. Wayner
Attorney, Agent, or Firm—Markell Seitzman; Russel C. Wells

[57] ABSTRACT

A thermostat member (10) disposed within a coolant flow passage (12) of an engine comprises a valve (32,34,36,40,42) movable between first and second positions for opening and closing the flow passage (12) and when in the first condition prohibiting coolant to flow from the engine and when in the second condition permitting the coolant to flow to a heat exchanger. A thermally responsive element (22) contained within a housing portion (16), and coupled to the valve. The element expandable in volume, when exposed to a predetermined temperature so as to urge the valve into the first position to terminate flow therethrough and a heater (50) for increasing the temperature of the element above the temperature of the coolant, to cause the element to urge the valve into the second cindition.

2 Claims, 3 Drawing Figures

PROGRAMMABLE THERMOSTAT AND SYSTEM THEREFOR

BACKGROUND AND SUMMARY OF THE INVENTION

The present invention relates generally to engine thermostats, more particularly to a programmable thermostat and related system capable of controlling coolant temperature to variable set points.

In order to cool the cylinders and cylinder heads of an automotive engine coolant is pumped through passages within the engine. A thermostat is preferably lodged in one of these passages. At a predetermined temperature the thermostat opens and/or closes thereby permitting the engine coolant to be cooled by the radiator and thereafter returned to the engine. Typically these thermostats fall into two categories the throttle thermostat and the bypass thermostat. The throttle thermostat acts as a variable restriction to the flow of the coolant between the engine and radiator. The bypass thermostat permits the coolant to initially flow in only the engine while the flow to the radiator remains blocked. Once the operating temperature has been reached, the thermostat allows the coolant to flow to the radiator. These thermostats may be located at the engine inlet or outlet.

The prior thermostats automatically open and close about a fixed set point. It is the object of the present invention to provide a thermostat which is programmable thereby providing a variable set point which in turn provides for variable control of the coolant temperature. It is a further object of the present invention to provide a programmable thermostat which can provide increased engine temperatures during warm up and lower engine temperatures during extended running.

Accordingly, the invention comprises a thermostat and system for controlling coolant temperature of an engine, comprising a thermostatic member disposed within a coolant flow passage of an engine comprising valve means, movable between first and second positions for opening and closing the flow passage and when in the first condition inhibiting coolant flow from the engine and when in said second condition permitting the coolant to flow to a heat exchanger. The system includes a thermally responsive element coupled to the valve means. The element is expandable in volume when exposed to a predetermined termperature so as to urge the valve means into the first position to terminate flow therethrough and means for increasing the temperature of the element in response to control signals, above the temperature of the coolant, to cause the element to urge the valve means into the second condition.

Many other objects and purposes of the invention will be clear from the detailed description of the drawings.

DETAILED DESCRIPTION OF THE DRAWINGS

Figure 1:
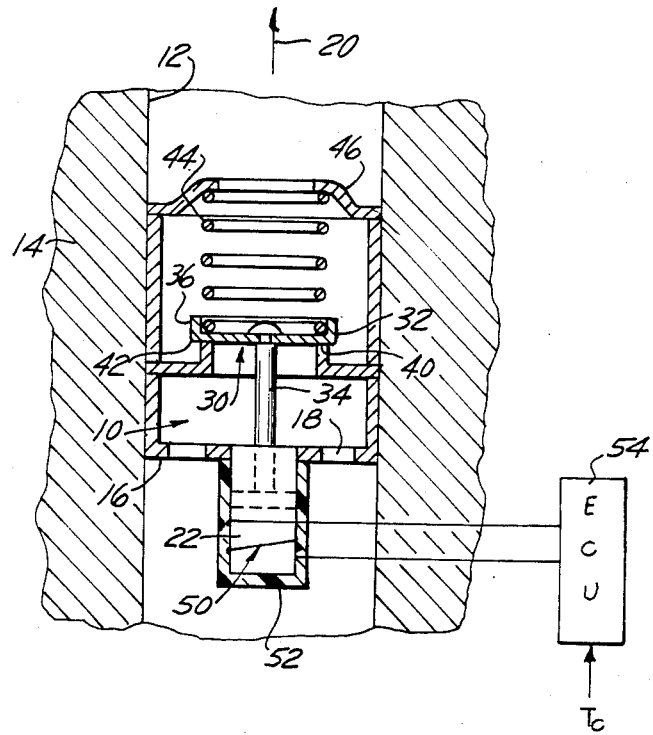
FIG. 1 diagrammatically illustrates a throttle type programmable thermostat.

With reference to FIG. 1, there is illustrated a programmable thermostat generally illustrated as 10. The thermostat is lodged within a passage 12 formed in the engine 14. The thermostat 10 comprises a housing 16 having a plurality of openings 18 therein to permit coolant flow, generally designated by arrow 20 from the engine to the radiator. A wax pellet 22 is supported by the housing 16. The thermostat 10 further includes a valve generally shown as 30 comprising a movable valve closure element 32 and cooperating valve seat 40. The valve closure element 32 comprises a piston 34, part of which is received within the wax pellet 22. The other end of the piston 34 is attached to a valve head 36. Positioned within the housing 16 is the valve seat 40 adapted to engage a corresponding seating surface 42 of the valve head 36. Positioned upstream of the valve seat 40 is a spring 44 which is biased against a flange 46 to urge the valve head 36 onto the valve seat 40. Positioned in thermal engagement with the wax pellet 22 is means for controlling the expansion of the pellet. Such means may comprise an electrical heater generally designated as 50. Positioned about the electrical heater 50 may be a layer of insulation 52. The electrical heater 50 is communicated to an electronic control unit generally designated as ECU 54. Coolant temperature, Tc, may also be communicated to the ECU 54.

In operation, when the electrical heater 50 is not activated, the programmable thermostat operates as a conventional thermostat wherein when the coolant temperature achieves the desirable set point the wax pellet expands thereby urging piston 34 outwardly therefrom dislodging the valve head 36 from its corresponding valve seat 40 to permit the flow of coolant between the engine and radiator. As the coolant temperature lowers, the wax pellet contracts permitting the spring 44 to urge the valve head 36 into sealing engagement with the seat 40 to terminate the flow of coolant. In this manner the coolant temperature cycles about a fixed set point. The spring 44 and thermal characteristics of the wax pellet 22 are chosen to provide a first set point to permit the engine to warm up quickly.

During operating conditions such as extended running the ECU 54 activates the electrical heater 50, such as by a pulse width control signal. The electrical heater 50 heats the wax pellet thereby urging the piston 34 to move outwardly against the bias force of the spring 44 to urge the valve head 36 away from its valve seat 40 and permit coolant to flow to the radiator. By controlling the duty cycle of the control signal, the thermostat 10 is made to open and close in a variable manner to control the coolant temperature to variable though predetermined levels. Such control of the thermostat may be affected in an open or closed loop made. Closed loop control may be accomplished by comparing the coolant temperature, Tc, to a temperature command signal generated within the ECU 54.

Figure 2:
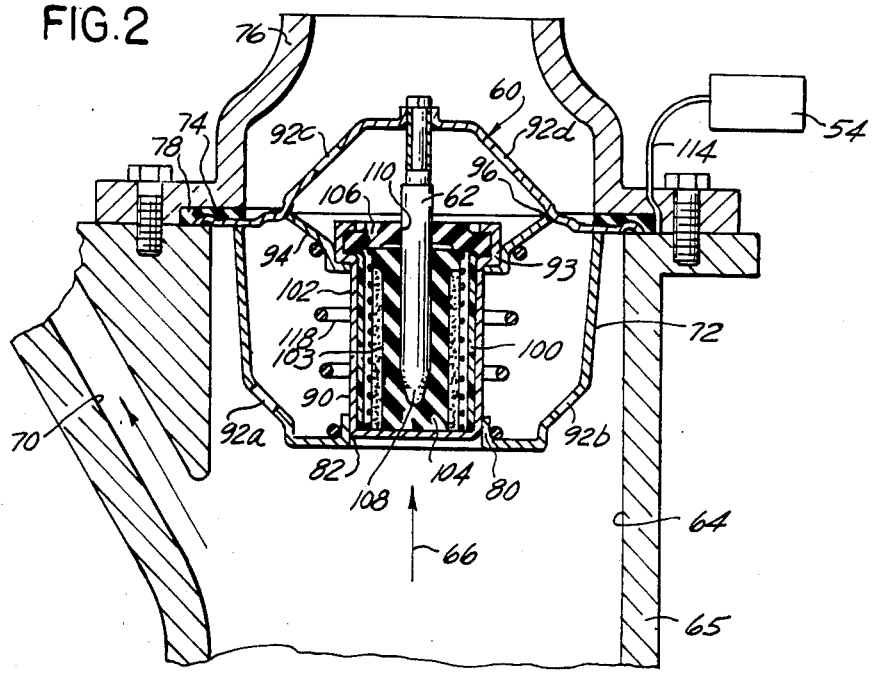
FIG. 2 illustrates an alternate embodiment of the invention.
Figure 3:
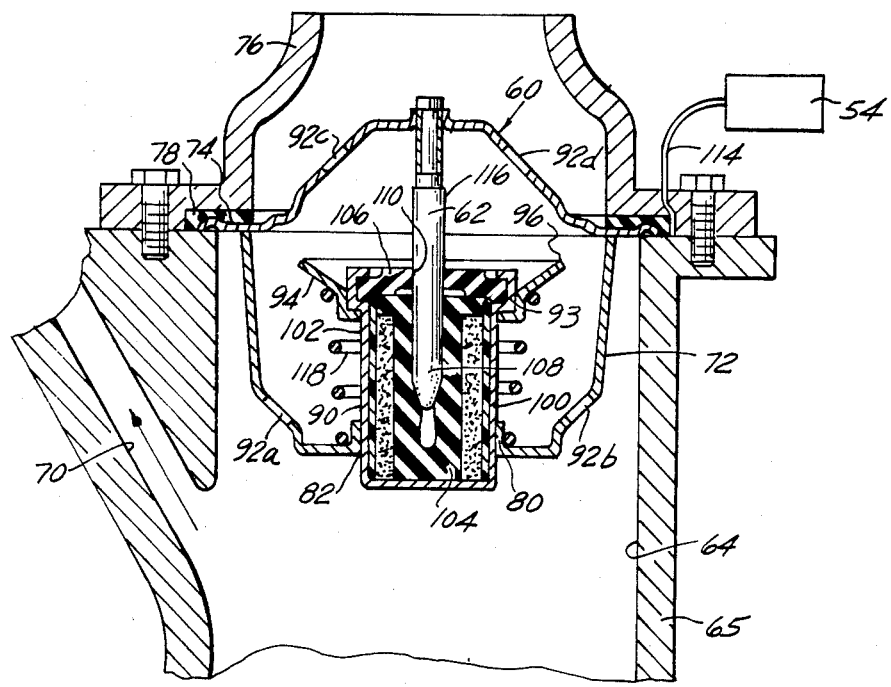
FIG. 3 illustrates a further alternate embodiment of the invention.

The thermostat 10 shown in FIG. 1 illustrates the use of a movable piston 34. The alternate embodiments illustrated in FIGS. 2 and 3 illustrate a programmable thermostat generally designated as 60 having a fixed piston 62. Thermostat 60 is lodged within a passage 64 in the engine 65 to the radiator. The flow of coolant from the engine to the radiator is generally illustrated by arrow 66. The engine 65 may be provided with a bypass passage 70 which leads from the engine to a water pump (not shown). The thermostat 60 further includes a housing 72 which supports the piston 62 at its upper end. The housing 72 may include a radial flange 74 which is supported by the engine 65. The thermostat 60 is fixed to the engine 65 by an outlet housing 76, which is secured by known means to the cylinder head. A gasket 78 may be introduced between the flange 74 and outlet housing 76.

The lower end of the thermostat housing 72 includes an inwardly directed flange 80 forming a bore 82 to receive a pellet housing 90. The housing 72 further includes a plurality of openings 92a–b to permit coolant to flow therethrough. The pellet housing 90 is fabricated with a shoulder 93 near its upper extreme. Attached to the shoulder 93 of the pellet housing 90 is a generally conically shaped valve closure element 94. The valve closure element 94 is fabricated with an inwardly directed flange 96 which is secured by known means to the shoulder 93. The valve closure element 94 is movable with the pellet housing 90. A valve seat 96 is formed at the point that the valve closure element 94 engages the housing 72.

FIG. 2 illustrates the thermostat 60 in a closed condition wherein the valve closure element 94 is positioned against its corresponding valve seat 96. The pellet housing may support a layer of insulation 100. Positioned interior to this layer of insulation 100 is an electrical heater element 102. Positioned interior to the electric heater element is a wax pellet 103, preferably of a copper impregnated wax. Positioned interior to the wax pellet 103 is a rubber diaphragm generally indicated as 104. The insulation, electric heater element, wax pellet and diaphragm are secured within the pellet housing 90 by a seal 106 which is secured in place by a crimped over portion of the pellet housing 90. The piston 62 is received within an opening 110 of the seal 106 and its lower end is received in form fitting engagement with the diaphragm. The electric heater element 102 is communicated to the ECU 54 through appropriate wiring 114. As the wax pellet 103 is heated by the electrical heater element 102 or by the temperature of the coolant, it expands thereby squeezing the diaphragm 100 against the lower tapered portion 108 of the piston 62 thereby urging the pellet housing 90 and valve closure element 94 downwardly in a manner as illustrated in FIG. 3, off from its corresponding seat 96 permitting coolant fo flow across the thermostat.

Reference is made to FIG. 3 which illustrates an alternate embodiment of the invention and further illustrates the thermostat 60 in an open condition. It should be noted that in the embodiment illustrated in FIG. 3, the electric heater element has been removed. The heating element in this embodiment is the piston 62 which may be fabricated of electrically resistant material which when heated by control signals received from the ECU 54 causes the wax pellet to expand in a manner similar to that described above. A thermal insulation barrier 116 may be placed on the exposed upper extreme of the piston 62 to thermally insulate it from the coolant. As the size of the wax pellet reduces to its nominal size due to the lessening of the coolant temperature or by the removal of the control signals, the return spring 118 urges the valve closure element 94 and pellet housing 90 upwardly to thereby terminate fluid communication through the thermostat.

Many changes and modifications in the above described embodiments of the invention can of course be carried out without departing from the scope thereof. As an example if the copper impregnated waxed pellet, as illustrated in FIGS. 2 and 3, is made sufficiently conductive, then the pellet itself may be heated by the control signals from the ECU 54. Accordingly, the scope of the invention is intended to be limited only by the scope of appended claims.

We claim:

1. A thermostat comprising a housing including a fluid inlet and fluid outlet and a valve seat proximate to and downstream of said fluid outlet;

a piston rigidly fixed to and extending into said housing, said piston including a tapered end;

a valve closure element movable relative to and adapted to sealably engage said valve seat;

a pellet housing positioned about said tapered end of said piston, said pellet housing including a first end slidably received within a conformal opening in said housing opposite said outlet, said pellet housing fixed to and movable with said valve closure element, a cylindrical rubber diaphragm, including a blind bore therein for loosely receiving said tapered end of said piston, said diaphragm located within said pellet housing, an annular, cylindrical pellet expandable in response to changes in temperative, said pellet positioned about and co-axial with said diaphragm, within said pellet housing;

a heating element positioned about said pellet for heating same;

a cylindrical layer of insulation interposed between said heating element and inner walls of said housing, wherein as said pellet expands within said housing it urges said diaphragm against the tapered end of said piston, said diaphragm, proximate said tapered end axially deforms thereby urging said pellet housing and valve seating element attached thereto outwardly through said opening thereby opening said fluid outlet.

2. The thermostat is defined in claim 1 further including a return spring positioned between said housing and said valve closure element for urging said valve closure element onto said valve seat.

* * * * *